Sept. 13, 1949.　　　　J. WILLIAMS　　　　2,481,553
PISTON AND LOCKED RING ASSEMBLY
AND PISTON RING LOCKING CLIP
Filed Dec. 23, 1947
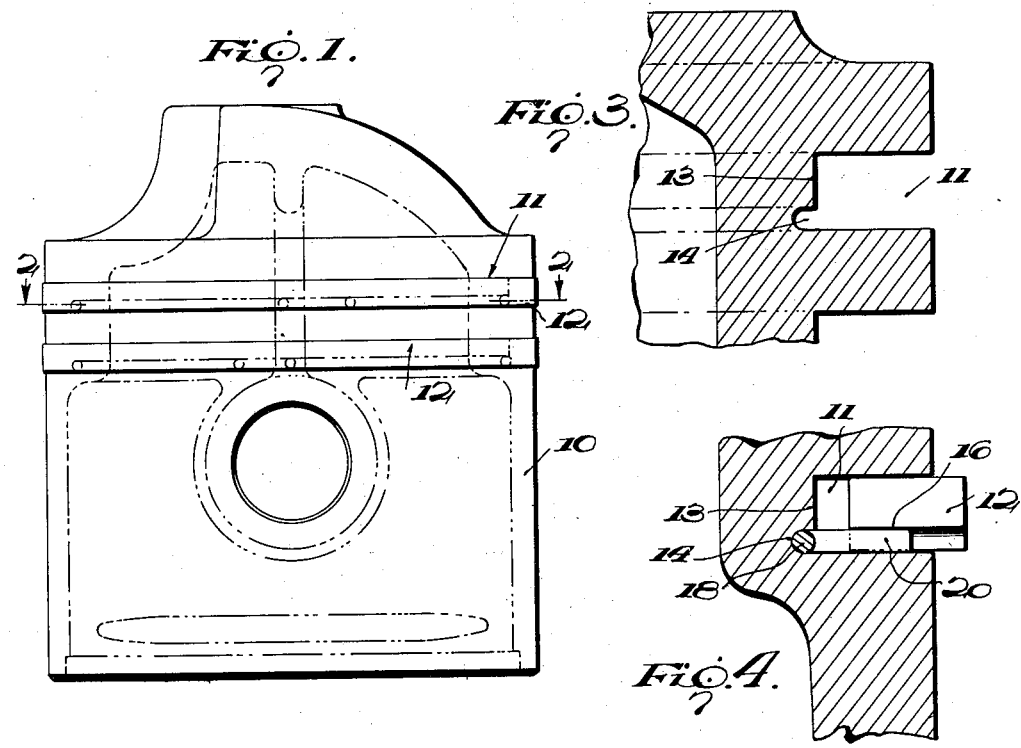
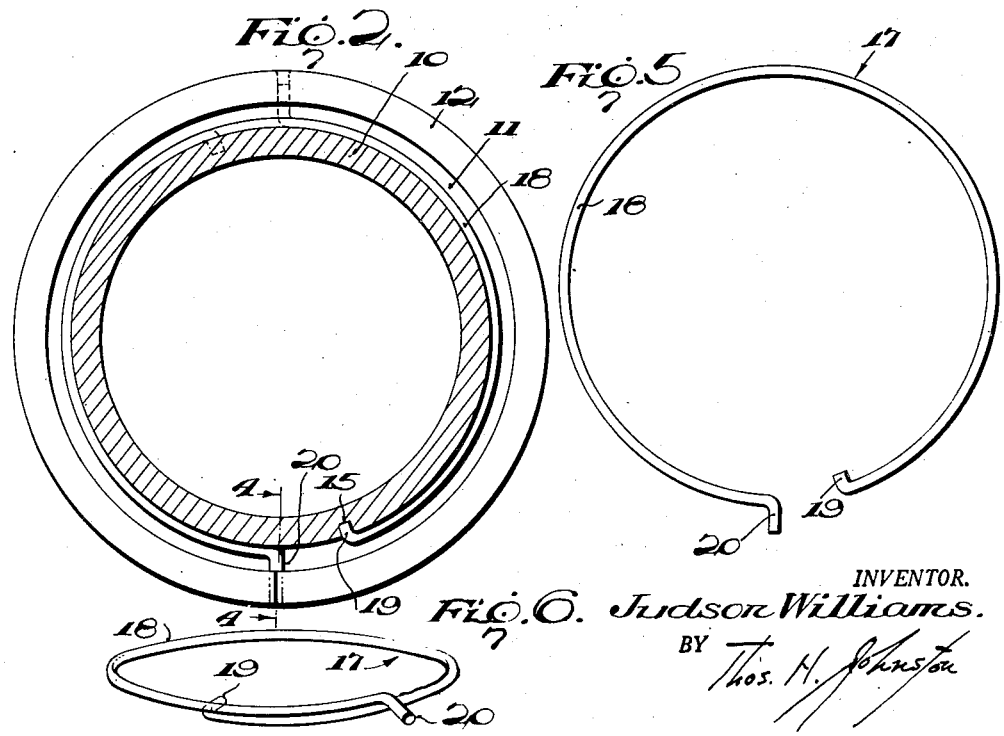
INVENTOR.
Judson Williams.
BY Thos. H. Johnston Patented Sept. 13, 1949

2,481,553

UNITED STATES PATENT OFFICE 2,481,553

PISTON AND LOCKED RING ASSEMBLY AND PISTON RING LOCKING CLIP

Judson Williams, Ben Salem, Pa.

Application December 23, 1947, Serial No. 793,410

1 Claim. (Cl. 309—44)

This invention relates to an improved piston and locked ring assembly, and piston ring locking clip of the general character disclosed in my prior application for a similar invention, filed November 19, 1946, Serial No. 710,882.

In my prior application mentioned, a segmental, annular clip is countersunk in the bottom wall of the ring groove of a piston and provided with a stop pin which engages the piston ring for locking the ring against creeping movement circumferentially of the piston, the resilient grip of the clip about the piston being relied upon to hold the clip stationary. While the resilient grip of the clip has been found sufficient in most instances to hold the clip stationary, still, in certain installations where an engine is subjected to long periods of continuous operation and the clip is therefore, as a result, subjected to prolonged high temperatures, experience has shown it of advantage to positively lock the clip stationary on the piston.

Therefore, the present invention, in addition to the objects set forth in my prior application mentioned, has as its objects to provide an assembly wherein the locking clip for the piston ring will itself be positively locked against creeping movement circumferentially of the piston, wherein the clip will be provided at one end with a stop pin to engage the piston ring and at its opposite end with an anchoring stud to removably engage in a suitable socket in the bottom wall of the piston ring groove, and wherein the resilient grip of the clip about the piston will serve to maintain the stud firmly seated in said socket for locking the clip stationary.

Other and incidental objects of the invention will appear during the course of the following description, and in the drawings:

Figure 1 is an elevation of my improved assembly.

Figure 2 is a horizontal section on the line 2—2 of Figure 1.

Figure 3 is a fragmentary vertical section showing a typical channel in the bottom wall of one of the ring grooves of the piston, the piston ring and locking clip being removed.

Figure 4 is a fragmentary vertical section on the line 4—4 of Figure 2.

Figure 5 is a detail plan view of the locking clip and showing said clip expanded.

Figure 6 is a perspective view showing the clip in its normal diameter.

Referring now more particularly to the drawings, I have shown an internal combustion engine piston 10 provided with ring grooves 11 in which fit resilient piston rings 12. The number of ring grooves and rings is immaterial, and while I have shown the rings with square ends to form a butt joint therebetween, still, it may be noted that this detail is also immaterial, as any other approved joint may be employed.

The bottom walls of the ring grooves 11 are indicated at 13, and formed in each of said walls is an annular channel 14 completely encircling the piston. In the present instance, the channel 14 is shown as located at the bottom inner corner of the ring groove, but this detail is unimportant as the channel may be otherwise located vertically of said groove. At any suitable point in each of the channels 14, the piston is provided with a radial socket 15, and formed in the ends of each of the rings 12 at the lower side thereof, as best seen in Figure 4 of the drawings, is a radial socket 16. If preferred, the socket may be located at some other point circumferentially of the ring.

In conjunction with each of the rings 12, I provide a locking clip 17 therefor, shown in detail in Figures 5 and 6 of the drawings. The clip is preferably formed from a length of suitable resilient wire and comprises a split annulus 18, the end portions of which, as seen in Figure 6, normally overlap. Near one end, the wire is bent to provide an in-turned radial anchoring stud 19, while near its opposite end, said wire is bent to provide an out-turned radial stop pin 20 somewhat longer than the stud. The clip is of a diameter to resiliently and more or less tightly grip the piston 10 within any one of the channels 14.

In use, the clip 17 is expanded, as suggested in Figure 5, and disposed to embrace the piston 10 within any one of the grooves 11, when the clip is so seated in the channel 14 of said groove that the stud 19 of the clip engages, as seen in Figure 2, in the socket 15 of said channel. The clip will thus be flexed to resiliently grip the piston so that the stud 19 thereof will be held firmly seated in said socket for positively locking the clip against creeping movement circumferentially of the piston. At the same time, however, the clip may be readily removed when so desired. One of the rings 12 is next positioned in the usual manner within the ring groove to surround the locking clip, when the ends of the ring are so disposed that the stop pin 20 is freely received in the socket 16 of the ring. Thus, since the clip 17 is itself positively locked stationary, the clip will in turn function to positively lock the piston ring against creeping movement circumferentially of the piston.

The sockets 15 of the channels 14 of the ring grooves 11 are staggered circumferentially of the piston. Accordingly, as will be appreciated, the piston rings 12 will be locked in such relative position that the several joints of the ring ends will be disposed out of vertical alignment while creeping of the rings to line up said joints with consequent loss of compression, will be prevented.

Attention is now directed to the fact that since the annulus 18 of each of the locking clips 17 is fully countersunk in the corresponding channel 14 therefor, the ring grooves 11 of the piston will be obstructed by the stop pins 20 only. A free flow of oil either circumferentially of said grooves or radially thereof will thus be permitted to provide proper lubrication for the rings 12 while expansion or contraction of the rings will be unhampered. Also, it is to be noted that since the clips 17 are resilient, a yieldable connection between each of the stop pins 20 and its annulus 18 is provided. Thus, the pins will be supported to yield somewhat to end thrust of the rings 12 and so cushion in some degree any pounding of the ends of the rings against said pins to prevent premature wear of the pins.

Having thus described my invention, I claim:

An assembly of the character described including a piston having a ring groove, a piston ring disposed in said groove, and a split resilient annulus countersunk in the bottom wall of said groove yieldably gripping the piston and provided at one end with an anchoring stud penetrating the piston to lock said annulus against creeping circumferentially of the piston and at its opposite end with a stop pin engaging said ring and locking the ring against rotation.

JUDSON WILLIAMS.

REFERENCES CITED

The following references are of record in the file of this patent:

UNITED STATES PATENTS

| Number | Name | Date |
|---|---|---|
| 1,711,861 | Stallard | May 7, 1929 |
| 2,085,457 | Westerhouse | June 29, 1937 |